July 22, 1941.  G. STEUERLEIN  2,250,240
LOAD CARRIER FOR AIRCRAFT
Filed Oct. 30, 1937  2 Sheets-Sheet 1
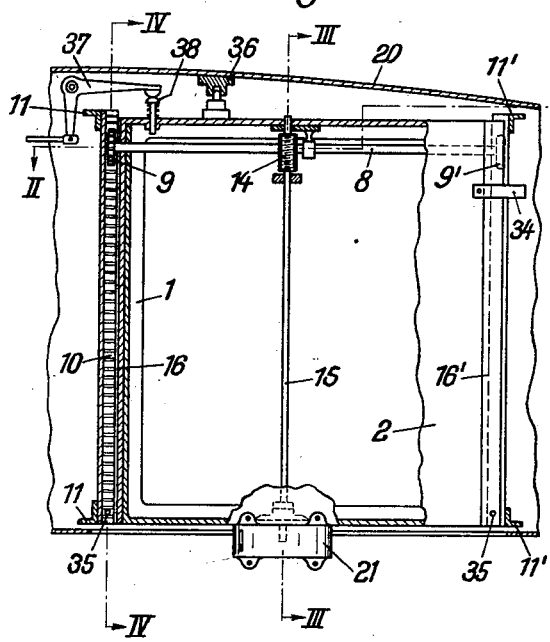
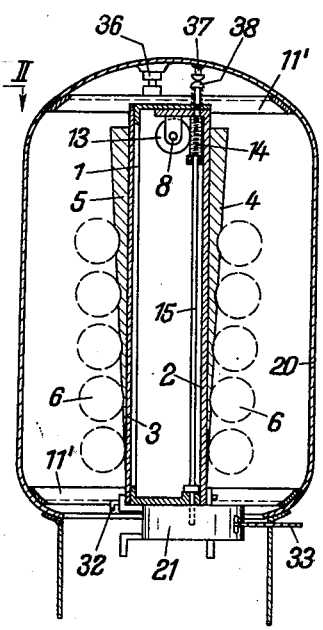
Inventor:
Gustav Steuerlein
by Michaelis & Michaelis
Attys July 22, 1941.  G. STEUERLEIN  2,250,240

LOAD CARRIER FOR AIRCRAFT

Filed Oct. 30, 1937  2 Sheets-Sheet 2

Inventor:
Gustav Steuerlein

Patented July 22, 1941

2,250,240

UNITED STATES PATENT OFFICE 2,250,240

LOAD CARRIER FOR AIRCRAFT

Gustav Steuerlein, Dessau, Germany, assignor to Junkers Flugzeug-und-Motorenwerke Aktiengesellschaft, Dessau, Germany Application October 30, 1937, Serial No. 171,900
In Germany November 12, 1936

10 Claims. (Cl. 89—1.5)

My invention relates to aircraft and more especially to the accommodation of loads in an aircraft hull. It has particular reference to a carrier for comparatively heavy bodies such as bombs, designed to be dropped by the craft, and it is an object of my invention to provide a load carrier, which is arranged to be lifted and lowered in a simple manner so that the loads to be accommodated thereon can be secured to it while the load carrier is located outside of the craft, whereupon it can easily be returned into its raised position in the craft together with the loads attached to it.

In order to keep the head resistance of aircraft as low as possible, objects such as bombs, tins containing food or ammunition, etc., which shall be dropped during flight, have been accommodated in the hull. Objects of considerable length have preferably been arranged in vertical position, standing on edge.

Such an arrangement of objects to be dropped involves the drawback that when dropped, they do not follow a direct path, but, being influenced by the sudden action of the dynamic pressure of the wind, at first oscillate thus reducing the likelihood of hitting a mark upon the ground. Long heavy objects with their centers of gravity situated near one end such as for instance aerial bombs, if dropped from an aircraft in horizontal position, do not display this drawback, but directly after being dropped follow a direct path, thereby increasing their chance of hitting their mark.

In order to effect a saving in space, such bodies have been arranged in super-position. However this arrangement involves the difficulty of introducing the heavy bodies into the interior of the hull and of fixing them in position therein.

It is an object of this invention to obviate this drawback, when accommodating in aircraft a plurality of heavy and readily disengageable bodies.

According to this invention the load carrier can be lifted and lowered relative to the hull. When lowered into loading position, the means for attaching and for disengaging the loads as well as the loads themselves are readily accessible from all sides so that the loading and the unloading, the fixing in place and the adjusting of the disengaging means are readily accessible.

During flight and when the loads are dropped, the carrier is hidden in the hull and therefore does not create any additional air resistance. The bombs or the like drop through openings in the bottom of the hull. Preferably these openings are kept closed by flaps retained in their closing position by springs.

The disengaging of the loads is effected in a well-known manner by electrical and, if desired, by mechanical means.

According to this invention, when the load carrier is lowered into loading position, the power transmission for the mechanical release as well as the current carrying line leading to the electrical releasing devices are interrupted automatically. On the other hand when the load carrier is returned into the hull, the electrical connection as well as the mechanical power transmission are automatically returned into operative position.

In the drawings affixed to this specification and forming part thereof an embodiment of my invention is illustrated diagrammatically by way of example.

In the drawings:

Fig. 1 is a vertical partial section on the line I—I in Fig. 2 of a load carrier adapted to be lowered from the hull of an aircraft.

Fig. 2 is a horizontal partial section on the line II—II in Fig. 1.

Fig. 3 is a vertical section on the line III—III in Fig. 1 of the hull of a flying machine with the load carrier mounted therein.

Figure 4:
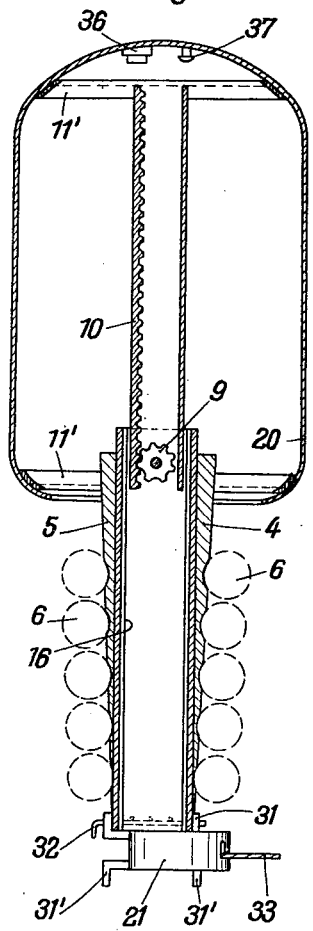
Fig. 4 is a vertical section on the line IV—IV in Fig. 1 of the aircraft hull with the load carrier lowered into loading position.

The load carrier illustrated in Figs. 1 to 4 mainly consists of a narrow quadrangular frame 1 formed of metal of U-section, this frame being closed on both sides by sheet metal covers 2 and 3. On both sides of the carrier are formed abutments 4, 5 for the loads 6 to be dropped, which are shown in dash lines. In the top part of the carrier extends a horizontal shaft 8 with gears 9, 9' fixed at either end. Each gear meshes with a rack 10 and 10' respectively, the racks extending in the direction in which the carrier can be raised near the two vertical end walls of the carrier and are fixed to the fuselage 20 by means of cross beams 11, 11'. On the middle portion of shaft 8 is fixed a worm-wheel 13 meshing with a worm 14, which is fixed on a vertical shaft 15 extending through the carrier and projecting from its bottom. As shown in Fig. 2, the racks 10, 10' are formed of U-section and project into guide rails 16, 16', likewise of U-section, which are secured to the vertical end walls of the carrier and serve to form guides for this latter.

When the shaft 15 is rotated, for instance by means of a crank, which is mounted on the downwardly projecting end of the shaft, the carrier together with the loads attached to it is lifted or lowered, according to the direction in which the crank and shaft are turned. In this operation the worm 14 and worm-wheel 13 act as self-locking elements, so that the carrier when lifted or lowered, will remain in any position, without requiring any special locking device.

Figure 5:
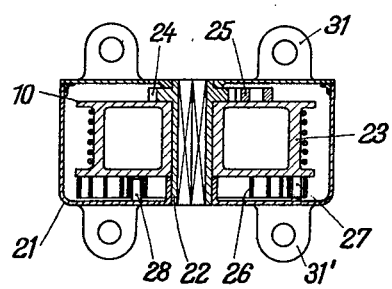
Fig. 5 is an axial section, drawn to larger scale, of a device for winding up the load carrier.
Figure 6:
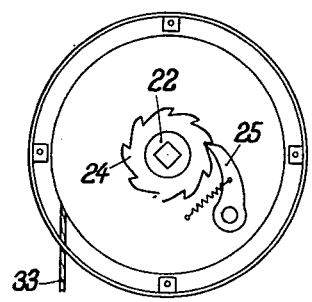
Fig. 6 is a plan view of this device, with the top plate removed.
Figure 7:
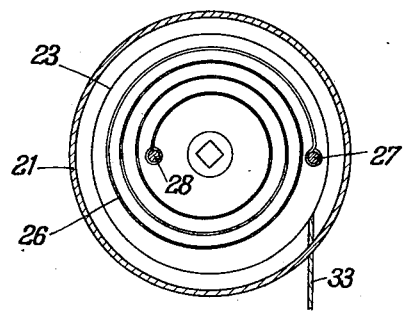
Fig. 7 is a bottom view, with the bottom removed.

Figs. 5 to 7 illustrate a ratchet-like mechanism for rotating the shaft 15. In a casing 21 is arranged for rotation a sleeve 22 having a square hole therethrough, adapted to be mounted on the lower end of shaft 15, and a drum 23 which is free to rotate around the sleeve. A ratchet wheel 24 for engagement with the sleeve and a pawl 25 pivoted on the drum cause the sleeve to be rotated by the drum when the latter is turned in one direction. A coil spring 26 has one end fixed to the drum at 27 and the other to the casing 21 at 28. By pulling a rope 33 wound around the drum 23 the drum is rotated and the sleeve 22 turned by the pawl, while, when the pull on the rope is discontinued, the rope is wound up again on the drum by the action of the spring 26.

The casing 21 is formed with projections 31, 31' whereby it can easily be fixed to the load carrier with the aid of bolts 32, which can readily be disengaged. Similar projections are provided on either side of the casing so that this latter can be attached to the load carrier with the shaft 15 projecting into the sleeve 22 from either side.

The device shown in Fig. 5 is attached to the load carrier only when this latter is to be lowered or raised. When the device is attached to the carrier shaft 15 one way up the latter can be lowered by repeatedly exerting a pull on the rope 33, while when the device is mounted on the carrier after having been turned upside down repeated pulling of the rope will cause the carrier to be lifted. When the carrier is raised, it may be secured in that position by means of bolts 35 (Fig. 1), which pass through holes in the flanges of the U-shaped guides 16, 16' and through the racks 10, 10'. The downward movement of the carrier is limited by a stop 34, which engages the angle iron 11'. In any case the carrier is lowered only far enough to offer free access to the means for attaching the loads.

The mode of operation of the electrical and mechanical load release is not illustrated in the drawings, save the contact for the electrical release and the connection of the system of rods for the mechanical release. An electrical contact 36, which may be of a wall plug type or the like, establishes a conductive connection from the releasing switch to the releasing means for the loads, when the load carrier is located in its raised position. When it is lowered, this contact is interrupted, as shown in Fig. 4. The system of rods serving to mechanically release the loads comprises for instance a rock lever 37 mounted in the top of the fuselage and a spring-actuated pin 38 mounted on the carrier, which, when the carrier is in its position of rest, is in reach of the lever 37. To this pin 38 are connected the mechanically operated releasing means (not shown). With the carrier in its raised position the loads may be released by adjusting the lever 37. Whenever the carrier is lowered the mechanical power transmission is interrupted.

I wish it to be understood that I do not desire to be limited to the exact details of construction shown and described for obvious modifications will occur to a person skilled in the art.

I claim:

1. An arrangement of the character described comprising a hollow airplane portion apertured on its underside, a carrier substantially rectangular in cross section having closed vertical sides, coacting means on said airplane portion and on said carrier for bodily moving the latter vertically whereby the carrier may be raised entirely within said hollow portion or lowered to project through said aperture, means on said carrier for actuating said coacting means and means extending laterally outward from at least one closed side of the carrier against which bombs may be releasably supported.

2. An arrangement of the character described comprising a hollow portion of an airplane apertured on its underside, a movable carrier, coacting means on said airplane portion and on said carrier for moving the latter vertically whereby the carrier may be raised entirely within said hollow portion or lowered to project through said aperture, means on said carrier for actuating said coacting means, and means on one side of the carrier against which bombs may be releasably supported.

3. An arrangement of the character described comprising a hollow portion of an airplane apertured on its underside, a carrier substantially rectangular in cross section, a horizontal shaft mounted thereon, gears on the extremities of said shaft, vertical racks mounted on said airplane portion with each of which one of the gears is in engagement, means for rotating said shaft for raising said carrier entirely within said hollow portion or for lowering it to extend downwardly through the aperture, and outwardly projecting means on at least one vertical side of the carrier against which bombs may be releasably supported.

4. An arrangement of the character described comprising a hollow portion of an airplane apertured on its underside, a carrier substantially rectangular in cross section having means projecting outwardly from two opposite sides thereof against which bombs may be releasably supported, a horizontal shaft extending through said carrier between and parallel with said opposite sides, racks mounted on said airplane portion, gears on the extremities of said shaft each in engagement with one of said racks, means on said carrier for rotating said shaft including means holding said shaft against accidental rotation, and coacting means on said airplane portion and on said carrier preventing disengagement of the gears from the racks.

5. An arrangement of the character described comprising a hollow airplane portion apertured on its underside, a carrier, a horizontal shaft mounted thereon and projecting at both extremities beyond said carrier, vertical racks mounted on said airplane portion, gears on said shaft extremities meshing with said racks, cooperating guide means on said airplane portion and on said carrier preventing disengagement of the gears from the racks, a vertical shaft mounted on the carrier, a worm thereon, a wormwheel on said horizontal shaft engaged by said worm whereby rotation of the vertical shaft turns the gears and moves the carrier vertically, the latter when raised being adapted to be housed within said hollow portion and when lowered to extend beneath the latter, and means on said carrier against which bombs may be releasably secured.

6. An arrangement of the character described comprising, in combination with a hollow portion of an aircraft apertured on its under side, a load carrier positioned by said portion for bodily movement in a vertical direction for raising and lowering the same through said aperture, means fixedly positioned by said hollow portion and means movably positioned by said carrier cooperable to raise or lower the same, and means supported by and in fixed relation to said carrier for actuating said movable means.

7. An arrangement of the character described comprising, in combination with a hollow portion of an aircraft apertured on its under side, a load carrier positioned by said hollow portion for bodily movement in a vertical direction for raising and lowering the same through the aperture, a rack fixedly positioned by said hollow portion, a pinion rotatably positioned by said carrier in engagement with said rack, and means mounted in a fixed position with relation to the carrier for actuating said pinion.

8. An arrangement of the character described comprising, in combination with a hollow portion of an aircraft apertured on its under side, a load carrier positioned by said portion for bodily movement in a vertical direction for raising and lowering the same through said aperture, means fixedly positioned by said hollow portion and means movably positioned by said carrier cooperable to raise or lower the same, and means detachably mounted in a fixed position with relation to the carrier for actuating said movable means.

9. An arrangement of the character described comprising, in combination with a hollow portion of an aircraft apertured on its under side, a load carrier positioned by said hollow portion for bodily movement in a vertical direction for raising and lowering the same through the aperture, a rack fixedly positioned by said hollow portion, a pinion rotatably positioned by said carrier in engagement with said rack, and means detachably mounted in a fixed position with relation to the carrier for actuating said pinion.

10. An arrangement of the character described comprising, in combination with a hollow portion of an aircraft apertured on its under side, a load carrier comprising at least one vertically extending member adapted to receive and releasably support a plurality of independent loads in vertically superimposed position, said carrier being positioned by said hollow portion of the aircraft for bodily movement in a vertical direction for raising and lowering the same through said aperture, means fixedly positioned by said hollow portion and means movably positioned by said carrier cooperable to raise or lower the carrier, and means mounted in a fixed position with relation to the carrier for actuating said movable means.

GUSTAV STEUERLEIN.